United States Patent
Villani et al.

(10) Patent No.: US 9,845,874 B2
(45) Date of Patent: Dec. 19, 2017

(54) COMPRESSION SEAL BRACKET AND SYSTEM FOR GENERATOR COOLER

(71) Applicant: General Electric Company, Schenectady, NY (US)

(72) Inventors: Michael Christopher Villani, Rensselaer, NY (US); Anthony Salvatore Arrao, Clifton Park, NY (US); Anthony James George, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 213 days.

(21) Appl. No.: 14/174,249

(22) Filed: Feb. 6, 2014

(65) Prior Publication Data

US 2015/0219217 A1 Aug. 6, 2015

(51) Int. Cl.
*F16J 15/02* (2006.01)
*F16J 15/06* (2006.01)

(52) U.S. Cl.
CPC ............ *F16J 15/021* (2013.01); *F16J 15/02* (2013.01); *F16J 15/06* (2013.01); *F16J 15/062* (2013.01)

(58) Field of Classification Search
CPC  F16J 15/02; F16J 15/106; F16J 15/021; F16J 15/061; F16J 15/0887; F16J 15/104; F16J 15/025; F01D 11/005; B60J 10/0005
USPC ......................................................... 277/637
See application file for complete search history.

(56) References Cited

U.S. PATENT DOCUMENTS

| | | | | |
|---|---|---|---|---|
| 2,593,648 A | * | 4/1952 | Aukers ..................... | B25B 5/06 24/563 |
| 2,976,067 A | * | 3/1961 | Zrimec .................. | F16J 15/028 277/637 |
| 3,091,265 A | * | 5/1963 | Ulstad .................... | B22D 18/06 141/383 |
| 3,139,009 A | * | 6/1964 | Harting .................. | F16J 15/024 123/193.3 |
| 4,070,221 A | * | 1/1978 | Anthony .................. | F16J 15/02 156/152 |
| 4,158,757 A | * | 6/1979 | Reichert .................. | H01H 9/04 174/564 |
| 4,230,326 A | * | 10/1980 | White ..................... | B02C 17/22 16/2.2 |
| 4,634,044 A | | 1/1987 | Hargrove et al. | |
| 4,637,619 A | * | 1/1987 | Stansberry ............. | F16J 15/106 277/637 |
| 4,768,684 A | * | 9/1988 | Dugge .................... | B61D 7/22 222/542 |

(Continued)

*Primary Examiner* — Eugene G Byrd
(74) *Attorney, Agent, or Firm* — Ernest G. Cusick; Hoffman Warnick LLC

(57) ABSTRACT

A compression seal bracket for sealing a thermally moveable end of a generator cooler is disclosed. The bracket may include a unitary body including a first portion at an angle to a second portion with an integral curvilinear portion therebetween. Each portion may have: a seal ring engaging member for engaging the seal ring to compress the seal against the seal seat, a shim member configured to be coupled to the seal seat between the seal ring engaging member and the seal seat, the shim member having a predetermined thickness. The seal ring engaging member and the shim member may include a plurality of corresponding fastener openings, each opening for receiving a fastener for coupling to the seal seat. A related bracket system is also disclosed.

20 Claims, 5 Drawing Sheets

(56) References Cited

U.S. PATENT DOCUMENTS

| | | | | | |
|---|---|---|---|---|---|
| 4,817,967 | A | * | 4/1989 | Belter | F16J 15/02 |
| | | | | | 123/198 E |
| 5,029,878 | A | * | 7/1991 | Ray | F16J 15/106 |
| | | | | | 277/643 |
| 5,035,185 | A | * | 7/1991 | Schultz | F16J 15/106 |
| | | | | | 105/247 |
| 5,090,713 | A | * | 2/1992 | Johnson | E02D 29/14 |
| | | | | | 277/648 |
| 5,785,114 | A | | 7/1998 | Armstrong et al. | |
| 5,934,686 | A | * | 8/1999 | Ottenschlager | F01M 11/0004 |
| | | | | | 123/195 C |
| 8,358,516 | B2 | * | 1/2013 | Weiss | H02G 3/081 |
| | | | | | 361/825 |
| 2005/0127616 | A1 | * | 6/2005 | Dorniok | F16J 15/061 |
| | | | | | 277/628 |
| 2008/0061517 | A1 | * | 3/2008 | Eijkelenberg | F16J 15/025 |
| | | | | | 277/637 |
| 2010/0126304 | A1 | * | 5/2010 | Sahm | F16J 15/106 |
| | | | | | 74/606 R |

\* cited by examiner

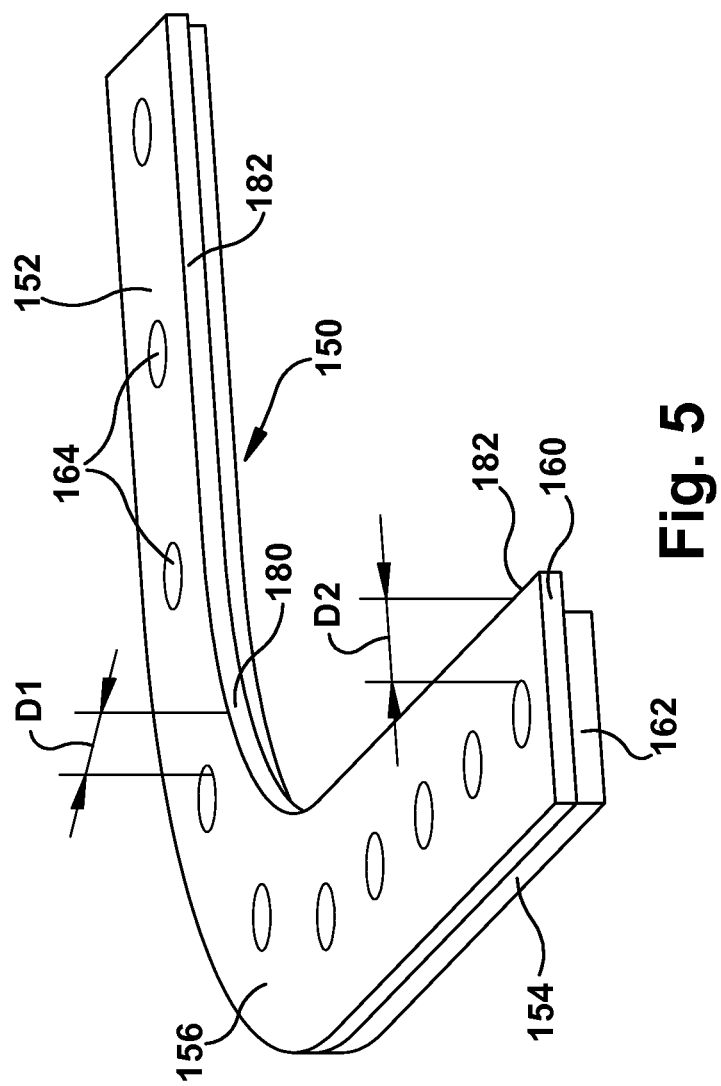

COMPRESSION SEAL BRACKET AND SYSTEM FOR GENERATOR COOLER

BACKGROUND

1. Technical Field

The disclosure relates generally to seals, and more particularly, to a compression seal bracket and bracket system for a generator cooler.

2. Background Art

Generator coolers are positioned within an opening in a frame of a generator in order to cool the generator during operation. One of the rectangular ends of the generator cooler thermally expands and contracts in a free floating fashion within the opening which necessitates a sliding seal engagement of the end with the opening in the frame to prevent leakage of gases, e.g., hydrogen, from the interior of the generator. In order to seal this free floating arrangement, a compression seal is typically employed that engages/rubs against a surface of the thermally moveable end of the generator cooler. Referring to FIGS. 1 and 2, four L-shaped compression seal brackets 10 are typically used to hold a compression seal 12 (FIG. 1 only) to seal a moveable end 14 within an opening 16 of a generator frame. Each L-shaped bracket 10 is clamped to a seal seat 20 by a plurality of fasteners 24 (e.g., bolts and flat washer combination) to compress seal 12 between a seal ring 22 (FIG. 1 only) and the seal seat.

L-shaped brackets 10 create a number of challenges to uniform sealing of moveable end 14. For example, as shown in FIG. 2, each L-shape bracket 10 is a straight member, which leaves corners 30 of opening 16 with non-uniform sealing force compared to other areas. Another challenge is creating uniform compression along the lengths of brackets 10. For example, as observed by comparing fasteners 24A and 24B in FIG. 2, fastener 24A is tightened to a first level leaving a gap G between bracket 10 and seal seat 20, while fastener 24B has been over-tightened such that no gap NG is present. Bracket 10 may actually be bent as indicated at fastener 24B. This over-tightening of fasteners leads to non-uniform compression of seal 12 (FIG. 1 only). In addition, over-tightening of fasteners 24 may lead to bending of brackets 10.

BRIEF SUMMARY

A first aspect of the disclosure provides a compression seal bracket comprising: a unitary body including a first portion at an angle to a second portion with an integral curvilinear portion therebetween, each portion having: a seal ring engaging member for engaging a seal ring that compresses a seal against a seal seat, a shim member configured to be coupled to the seal seat between the seal ring engaging member and the seal seat, the shim member having a predetermined thickness, and wherein the seal ring engaging member and the shim member include a plurality of corresponding fastener openings, each opening for receiving a fastener for coupling to the seal seat.

A second aspect of the disclosure provides a compression seal bracket system for sealing a thermally moveable end of a generator cooler, the system comprising: a seal seat configured for fixed coupling about a frame opening adapted to receive the generator cooler; a seal ring configured to compress a seal to the seal seat for sealing engagement with the thermally moveable end; and a compression seal bracket including a unitary body including a first portion at an angle to a second portion with an integral curvilinear portion therebetween, each portion having: a seal ring engaging member for engaging the seal ring to compress the seal against the seal seat, a shim member configured to be coupled to the seal seat between the seal ring engaging member and the seal seat, the shim member having a predetermined thickness, and wherein the seal ring engaging member and the shim member include a plurality of corresponding fastener openings, each opening for receiving a fastener for coupling to the seal seat.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a perspective view of a compression seal bracket according to embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a compression seal bracket and related system for a generator cooler. Although the teachings of the invention are described in relation to a generator cooler, it is understood that the compression seal bracket and system can be used in other applications.

Figure 1:
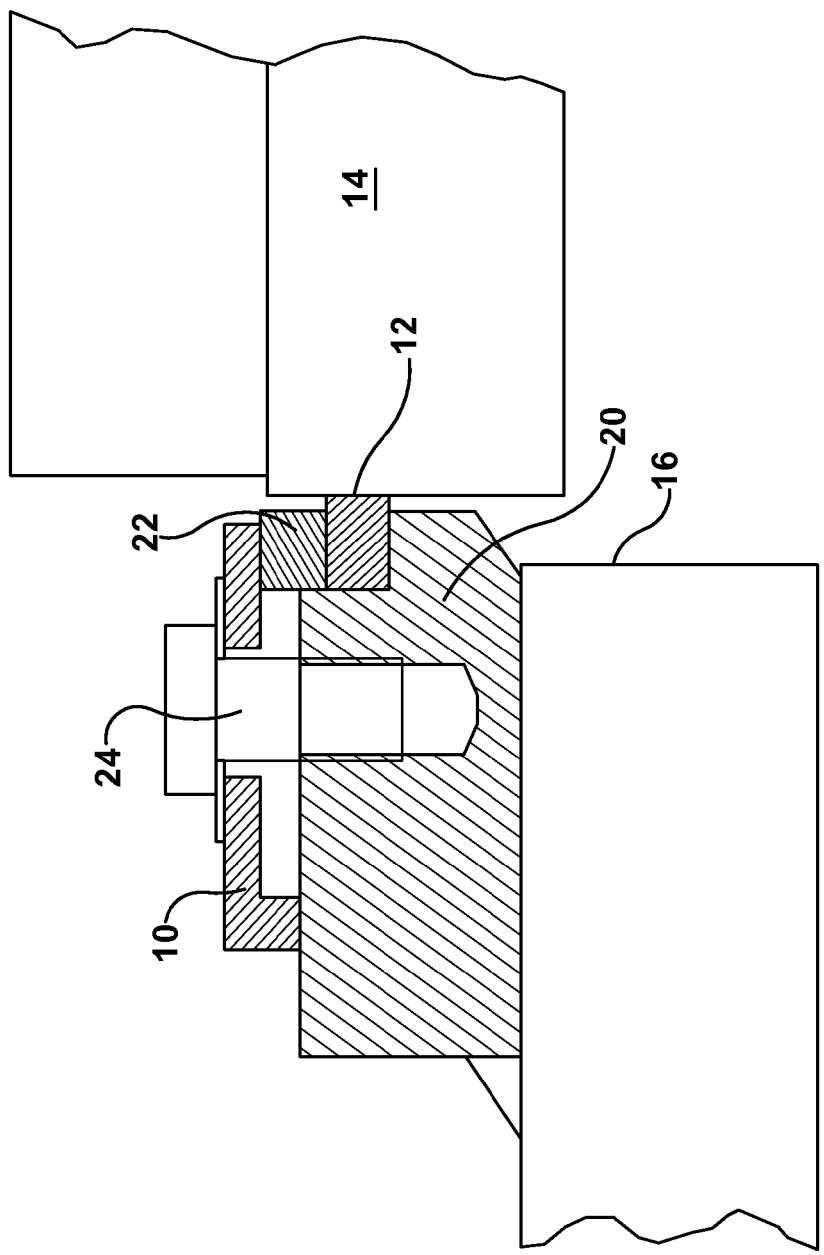
FIG. 1 shows a cross-sectional view of a conventional generator cooler compression seal bracket.
Figure 2:
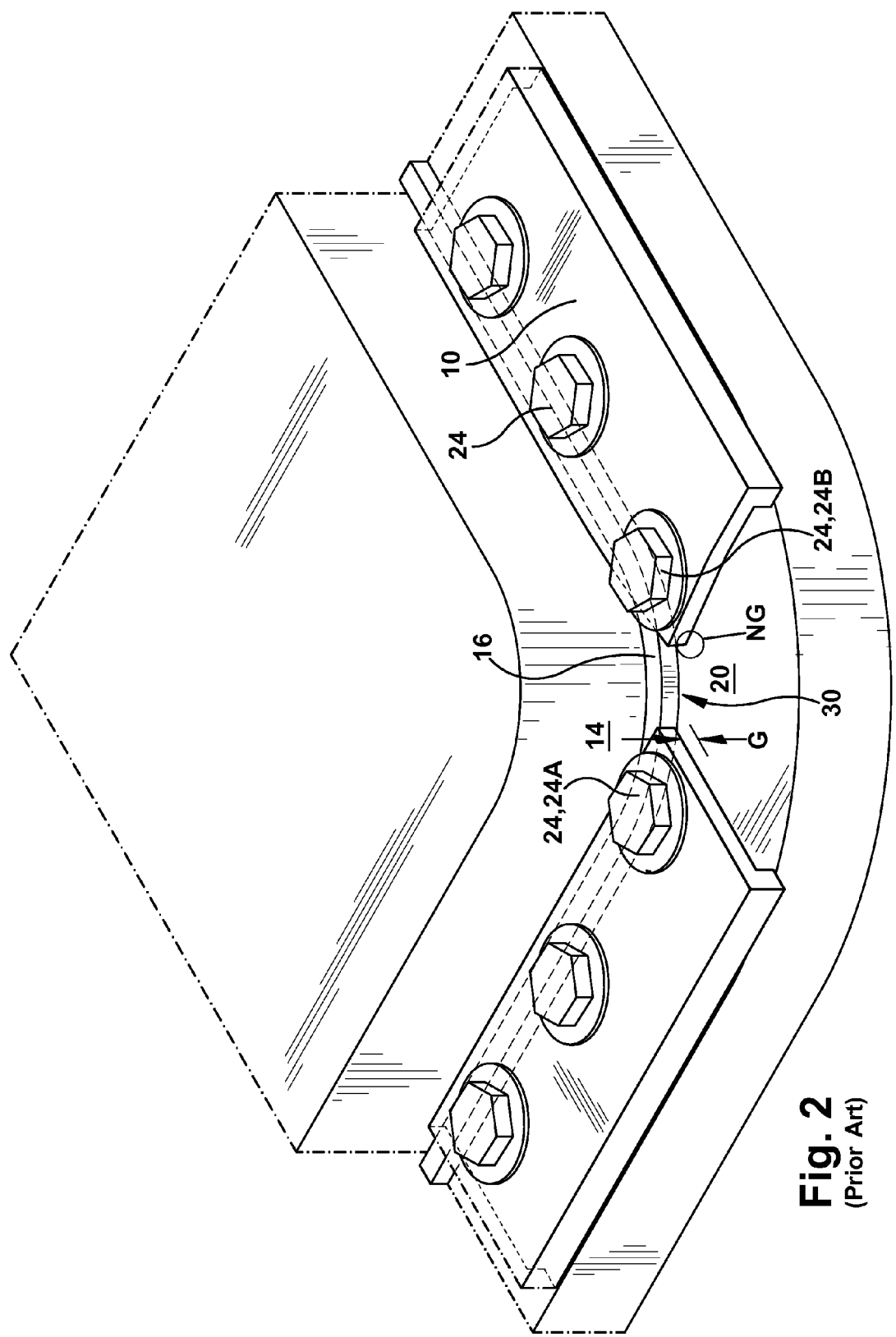
FIG. 2 shows a perspective view of a conventional generator cooler compression seal bracket.
Figure 3:
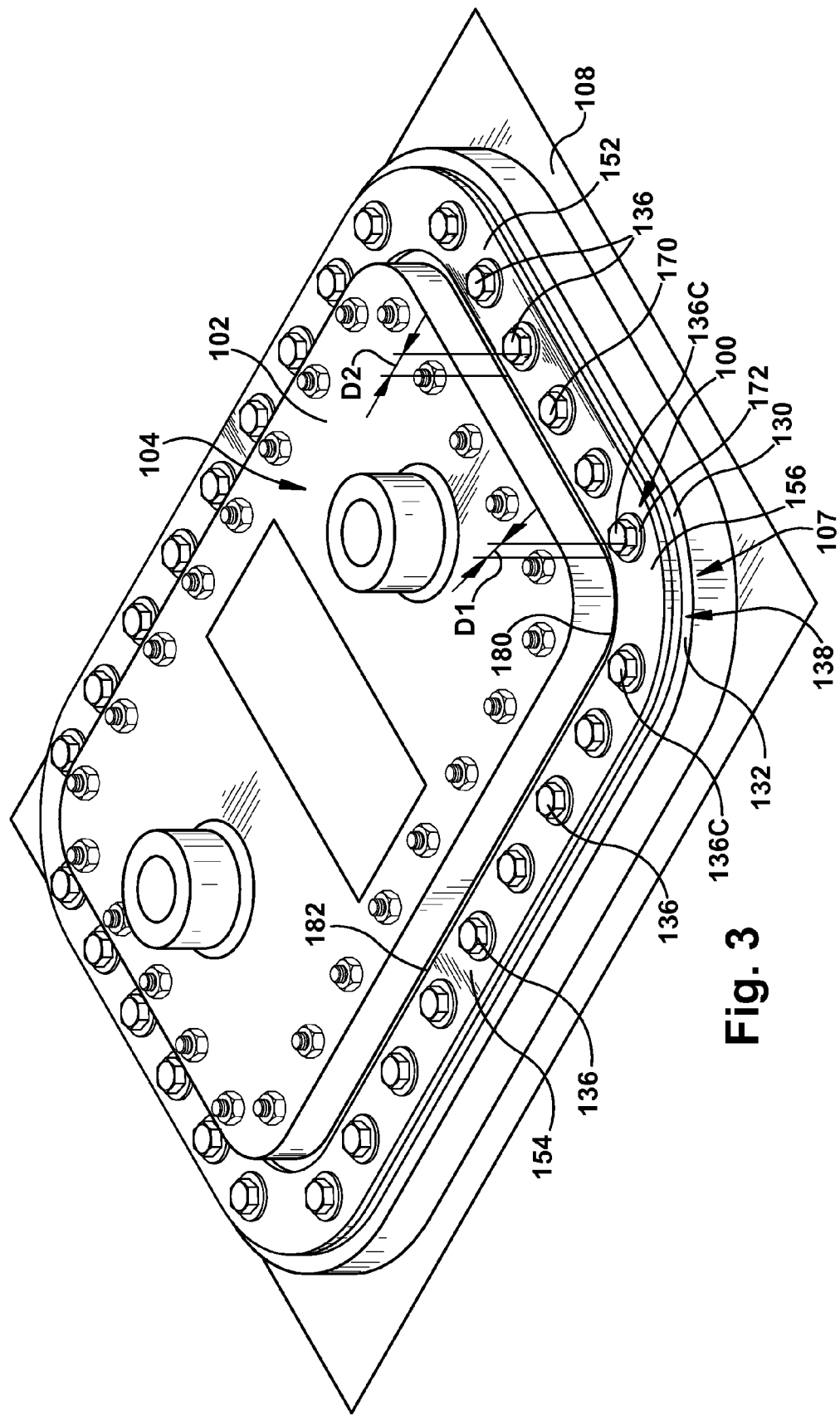
FIG. 3 shows a perspective view of a compression seal bracket and system for a generator cooler, in a mounted position, according to embodiments of the invention.
Figure 4:
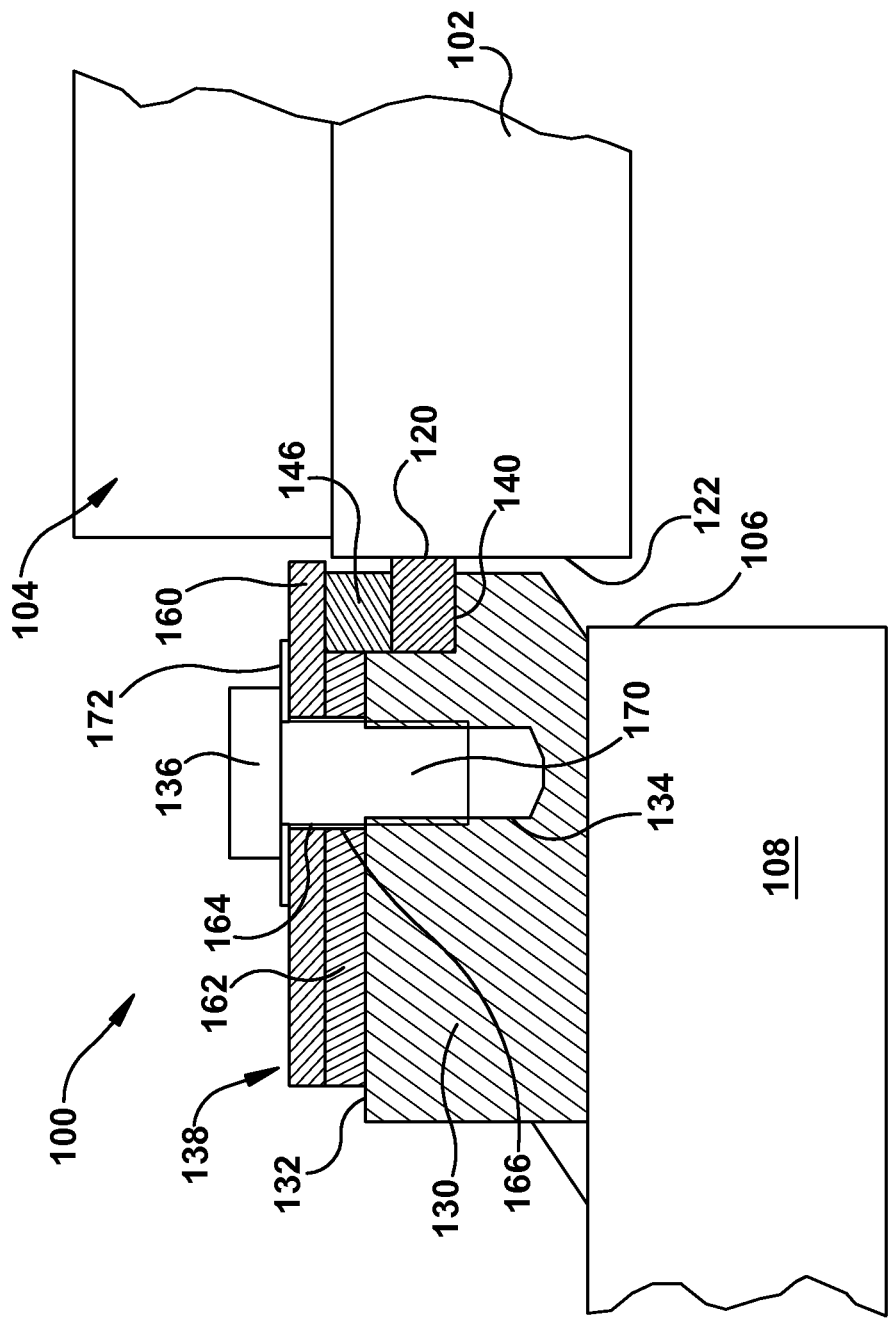
FIG. 4 shows a cross-sectional view of a compression seal bracket and system for a generator cooler, in a mounted position, according to embodiments of the invention.

Referring to the drawings, FIGS. 3-4 show a perspective and cross-sectional view, respectively, of a compression seal bracket system 100 for sealing a thermally moveable end 102 of a generator cooler 104. As understood in the art, generator cooler 104 includes an elongated body (not shown) that extends through a frame opening 106 in a generator frame 108. As shown best in FIG. 3, frame opening 106 and moveable end 102 typically have substantially rectangular cross-sections with rounded corners 107. Although not described, other shapes of frame opening 106 and moveable end 102 are within the scope of the invention. Moveable end 102 of generator cooler 104 is so named since it moves relative to frame opening 106 due to thermal contraction and expansion during operation of generator cooler 104. Since generator frame 108 includes operational gasses that need to be retained, e.g., hydrogen, frame 108 must be sealed to prevent leakage of these gases.

As shown best in FIG. 4, in order to seal moveable end 102, a compression seal 120 sealingly engages a surface 122 of moveable end 102. That is, seal 120 is configured to seal against thermally moveable end 102 of generator cooler 104. Seal 120 may be made of any now known or later developed seal material capable of withstanding the motion and corrosion of generator cooler 104, e.g., rubber, polymer such as neoprene, etc. As also shown in FIG. 4, compression bracket seal system 100 operates to position and retain seal 120, and may include a seal seat 130 configured for fixed coupling about frame opening 106, which is adapted to receive generator cooler 104. Seal seat 130 may be fixedly coupled about frame opening 106, i.e., to frame 108, using any now known or later developed mechanism, e.g., welding (as shown), bolting, etc.

Seal seat 130 includes an upper surface 132 including a plurality of threaded openings 134 therein for receiving a plurality of fasteners 136 for coupling a compression seal bracket 138 thereto, as will be described herein. Seal seat 130 also includes a seal seat element 140 on a side facing frame opening 106 for receiving seal 120. Seal seat element 140 is sized to operatively receive seal 120 and provide sufficient support to allow compression thereof under influence of bracket 138 and a seal ring 146. Bracket system 100 also includes seal ring 146 configured to compress seal 120 to seal seat 130 for sealing engagement with the thermally moveable end 102. Seal ring 146 may be made of any material with sufficient strength and corrosion resistance to compress seal 120 over a long period of time, e.g., a metal such as steel, or a metal alloy. Although not shown, seal ring 146 may be segmented.

Bracket system 100 also includes compression seal bracket 138. As shown in FIGS. 3 and 5, bracket 138 may include a unitary body 150 including a first portion 152 at an angle to a second portion 154 with an integral curvilinear portion 156 therebetween. In one embodiment, bracket 138 may include a single unitary, substantially rectangular body with curvilinear portions 156 such that bracket 138 extends all around frame opening 106, as shown in FIG. 3. In this case, the single, unitary body may be formed as one-piece or may be made by joining, e.g., via welding, a plurality of unitary bodies 150. Alternatively, bracket 138 may include a plurality of unitary bodies 150, (e.g., two or four, the latter of which is shown in FIG. 5) that are used together to extend about frame opening 106. In one embodiment, the angle may be substantially 90°; however, other angles may be used to accommodate different shaped moveable ends 102. Bracket 138 may be made of any material with sufficient strength and corrosion resistance, e.g., steel, and may be manufactured using any now known or later developed process, e.g., machining, forging, etc.

In contrast to conventional brackets, as shown in FIG. 4, bracket 138 may include a seal ring engaging member 160 for engaging seal ring 146 to compress seal 120 against seal seat 130, and a shim member 162 configured to be coupled to seal seat 130 between seal ring engaging member 160 and seal seat 130, i.e., surface 132 of seal seat 130. As illustrated in FIGS. 4 and 5, seal ring engaging member 160 and shim member 162 include a plurality of corresponding fastener openings 164, each opening for receiving a fastener 136 (FIGS. 3 and 4) for coupling to seal seat 130, i.e., threaded openings 134. As shown in FIGS. 3 and 4, each fastener 136 may include a bolt 170, and alternatively may further include a lock washer 172 to prevent rotation of bolt 170. Shim member 162 has a predetermined thickness that is selected to provide the appropriate amount of compression of seal 120 given the particular sized seal ring 146, seal 120 and seal seat element 140. That is, the predetermined thickness is configured to ensure seating of seal 120 with seal seat 130 in response to seal ring engaging member 160 and shim member 162 being fastened to seal seat 130 such that seal ring engaging member 160 engages seal ring 146 to compress the seal against the seal seat. In this fashion, seal 120 is compressed to an accurate amount to seal against surface 122 of moveable end 102. In one embodiment, predetermined thickness is selected to ensure approximately 30% compression of seal 120. Shim member 162 may be sized to allow a particular amount of deflection (e.g., approximately 3.8 millimeters) to attain the desired compression based on the durometer value of seal 120 (e.g., approximately 50-60 durometer). Although shim member 162 and seal ring engaging member 160 have been illustrated as separate members, it is understood that bracket 138 may be constructed as a single, unitary member, i.e., such that members 162, 164 are one piece.

Referring to FIGS. 3 and 5, in one embodiment, a distance D1 between plurality of fasteners 136C (FIG. 3 only)(and openings 164) along curvilinear portion 156 and an interior surface 180 thereof (facing moveable end 102) is less than a distance D2 between the plurality of fasteners 136 (FIG. 3 only) along first and second portions 152, 154 and an interior surface 182 thereof. This configuration allows for fasteners 136C (FIG. 3 only) to more accurately compress seal 120 adjacent to the corners of frame opening 106.

In operation, generator cooler 104 has free floating, moveable end 102 that expands and contracts thermally relative to generator frame 108. Seal 120 is positioned on seal seat element 140 and seal ring 146 is positioned thereover. Compression seal bracket 138 is positioned over seal ring 146 and is fastened to seal seat 130 by fasteners 136 being threaded into threaded openings 134 in seal seat 130. Shim member 162 has a predetermined thickness configured to allow compression of seal 120 such that seal 120 rubs against surface 122 of moveable end 102 to seal gases within frame 108. Shim member 162 allows for precise, predetermined amount of compression of seal 120 and tightening of bracket 138 to provide a substantially uniform compression to seal 120 about opening 106. Consequently, in contrast to conventional brackets, over-tightening of bracket 138 is not possible since no bending torque can be applied. In addition, bracket system 100 covers seal 120 in its entirety, i.e., none of seal 120 is exposed as in conventional designs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A compression seal bracket comprising:
a single, unitary body including a first portion at an angle to a second portion with a curvilinear portion there between and integral with each of the first portion and the second portion, each portion having:
a seal ring engaging member for engaging a seal ring that compresses a seal against a seal seat,
a shim member directly engaged by the seal ring engaging member and configured to be coupled to the seal seat between the seal ring engaging member and the seal seat, the shim member having a predetermined thickness,
wherein the seal ring engaging member and the shim member include a plurality of corresponding fastener openings, each opening for receiving a fastener for coupling to the seal seat, and
wherein a surface of the seal ring engaging member engages the seal ring and the shim member along a single plane of contact.

2. The compression seal bracket of claim 1, wherein the angle is substantially 90°.

3. The compression seal bracket of claim 1, wherein the predetermined thickness is configured to ensure seating of the seal with the seal seat in response to the seal ring engaging member and the shim member being fastened to the seal seat such that the seal ring engaging member engages the seal ring to compress the seal against the seal seat.

4. The compression seal bracket of claim 1, wherein each fastener includes a bolt.

5. The compression seal bracket of claim 4, wherein each fastener further includes a lock washer.

6. The compression seal bracket of claim 1, wherein a distance between a plurality of fasteners along the curvilinear portion and an interior surface thereof is less than a distance between a plurality of fasteners along the first and second portions and an interior surface thereof.

7. The compression seal bracket of claim 1, wherein the seal is configured to seal against a thermally moveable end of a generator cooler.

8. The compression seal bracket of claim 1, wherein the predetermined thickness is selected to ensure approximately 30% compression of the seal.

9. A compression seal bracket system for sealing a thermally moveable end of a generator cooler, the system comprising:
a seal seat configured for fixed coupling about a frame opening adapted to receive the generator cooler, the seal seat including a first single, unitary body having a first portion of the seal seat joined to a second portion of the seal seat with an integral curvilinear portion of the seal seat therebetween;
a seal ring configured to compress a seal to the seal seat for sealing engagement with an outward facing surface of the thermally moveable end; and
a compression seal bracket including a second single, unitary body having a first portion of the compression seal bracket joined to a second portion of the compression seal bracket with an integral curvilinear portion of the compression seal bracket therebetween, each portion having:
a seal ring engaging member for engaging the seal ring to compress the seal against the seal seat, the seal ring engaging member including a first surface between the seal ring engaging member and the seal ring at a first end of the seal ring engaging member,
a shim member configured to be coupled to the seal seat between the seal ring engaging member and the seal seat, the shim member having a predetermined thickness and a second surface between the shim member and the seal ring engaging member, the second surface being planar with the first surface of the seal ring engaging member, and
wherein the seal ring engaging member and the shim member include a plurality of corresponding fastener openings, each opening for receiving a fastener for coupling to the seal seat.

10. The compression seal bracket system of claim 9, wherein an angle between the first portion and the second portion of the compression seal bracket is substantially 90°.

11. The compression seal bracket system of claim 9, wherein the predetermined thickness is configured to ensure seating of the seal with the seal seat in response to the seal ring engaging member and the shim member being fastened to the seal seat such that the seal ring engaging member engages the seal ring to compress the seal against the seal seat.

12. The compression seal bracket system of claim 9, wherein each fastener includes a bolt.

13. The compression seal bracket system of claim 12, wherein each fastener further includes a lock washer.

14. The compression seal bracket system of claim 9, wherein a distance between a plurality of fasteners along the curvilinear portion of the compression seal bracket and an interior surface thereof is less than a distance between a plurality of fasteners along the first and second portions of the compression seal bracket and an interior surface thereof.

15. The compression seal bracket system of claim 9, wherein the predetermined thickness is selected to ensure approximately 30% compression of the seal.

16. The compression seal bracket system of claim 9, wherein the compression seal bracket includes a plurality of unitary bodies arranged about the opening.

17. The compression seal bracket of claim 9, wherein the seal seat includes a seal seat element on a side of the seal seat facing the frame opening, the seal seat element configured to provide support to allow compression of the seal by the seal ring.

18. The compression seal bracket of claim 9, wherein the seal ring engaging member directly engaging the shim member.

19. The compression seal bracket of claim 1, wherein the seal ring engaging member is unitary with the shim member.

20. A compression seal bracket system for sealing a thermally moveable end of a generator cooler, the system comprising:
a seal seat configured for fixed coupling about a frame opening adapted to receive the generator cooler;
a seal ring configured to compress a seal to the seal seat for sealing engagement with an outward facing surface of the thermally moveable end; and
a compression seal bracket including a first single, unitary body having a first portion joined to a second portion with an integral curvilinear portion therebetween, each portion having:
a seal ring engaging member for engaging the seal ring to compress the seal against the seal seat, the seal ring engaging member including a first surface between the seal ring engaging member and the seal ring at a first end of the seal ring engaging member, a shim member configured to be coupled to the seal seat between the seal ring engaging member and the seal seat, the shim member having a predetermined thickness and a second surface between the shim member and the seal ring engaging member, the second surface being planar with the first surface of the seal ring engaging member, wherein a portion of the seal ring engaging member at a first end is substantially vertically aligned with the seal, and wherein the seal ring engaging member and the shim member include a plurality of corresponding fastener openings, each opening for receiving a fastener for coupling to the seal seat.

\* \* \* \* \*